(12) United States Patent
Eden

(10) Patent No.: US 9,951,834 B1
(45) Date of Patent: Apr. 24, 2018

(54) SYSTEMS AND METHODS FOR DETECTING WEAR OF BRAKE PADS

(71) Applicant: Gideon Eden, Lexington, MA (US)

(72) Inventor: Gideon Eden, Lexington, MA (US)

( * ) Notice: Subject to any disclaimer, the term of this patent is extended or adjusted under 35 U.S.C. 154(b) by 0 days.

(21) Appl. No.: 15/428,960

(22) Filed: Feb. 9, 2017

(51) Int. Cl.
*F16D 66/02* (2006.01)
*F16D 55/225* (2006.01)

(52) U.S. Cl.
CPC ......... *F16D 66/027* (2013.01); *F16D 55/225* (2013.01); *F16D 66/022* (2013.01)

(58) Field of Classification Search
CPC ........................................ F16D 66/021–66/027
USPC ............... 188/1.11 E, 1.11 L, 1.11 R, 251 R; 340/453, 454; 116/208; 73/129
See application file for complete search history.

(56) References Cited

U.S. PATENT DOCUMENTS

| | | | |
|---|---|---|---|
| 5,133,431 A * | 7/1992 | Braun | F16D 66/024 188/1.11 L |
| 5,454,450 A | 10/1995 | Tanigawa | |
| 5,848,672 A * | 12/1998 | Brearley | F16D 65/18 188/1.11 L |
| 6,095,289 A * | 8/2000 | Ray | B66B 5/18 188/1.11 E |
| 6,360,850 B1 | 3/2002 | Odisho | |
| 6,366,201 B1 * | 4/2002 | Hanisko | F16D 66/026 188/1.11 E |
| 6,450,300 B1 * | 9/2002 | Kramer | F16D 66/026 188/1.11 L |
| 6,459,726 B1 | 10/2002 | Ovard | |
| 6,477,893 B1 * | 11/2002 | Djordjevic | F16D 66/02 188/1.11 L |
| 7,114,596 B2 * | 10/2006 | Borugian | F16D 51/20 188/1.11 E |
| 7,847,679 B2 | 12/2010 | Copeland | |
| 7,877,216 B2 | 1/2011 | Wright | |
| 8,310,356 B2 | 11/2012 | Evans | |
| 8,437,934 B2 * | 5/2013 | Degenstein | B60T 8/268 188/1.11 L |
| 9,353,815 B1 * | 5/2016 | Eden | F16D 66/027 |
| 9,644,696 B2 * | 5/2017 | Eden | F16D 66/027 |

(Continued)

FOREIGN PATENT DOCUMENTS

GB 2172945 10/1986

OTHER PUBLICATIONS

GILL—Downloaded on Nov. 11, 2015 from http://gillsc.com/content/through-hole-position-sensor.html; prior art reference as of at least Nov. 11, 2015.

(Continued)

*Primary Examiner* — Christopher P Schwartz

(57) ABSTRACT

The disclosure includes a system for indicating wear of a brake pad attached to a vehicle. The system can include a pad holder, a brake pad mechanically coupled to the pad holder, and a sensing device coupled to the brake pad and located at least partially within the cavity. The sensing device can include a first electrode and a second electrode embedded within the sensing device. The first electrode and the second electrode can measure electrical resistivity of an electrically conductive material located within the sensing device. The electrical resistivity can indicate a thickness of the internal portion of the brake pad after the internal portion has been eroded by the rotating portion of the wheel.

20 Claims, 12 Drawing Sheets

(56) References Cited

U.S. PATENT DOCUMENTS

| | | |
|---|---|---|
| 2002/0077088 A1 | 6/2002 | Yamanaka |
| 2002/0116992 A1 | 8/2002 | Rickel |
| 2007/0024113 A1* | 2/2007 | Thrush .................... F16D 66/00 |
| | | 303/155 |
| 2008/0036241 A1 | 2/2008 | Aisenbrey |
| 2008/0190712 A1 | 8/2008 | Hagberg |
| 2009/0050418 A1 | 2/2009 | Vargas |
| 2010/0030490 A1 | 2/2010 | Wright |
| 2010/0253497 A1* | 10/2010 | Bakker ................ F16D 66/026 |
| | | 340/454 |
| 2011/0133923 A1 | 6/2011 | Evans |
| 2012/0256492 A1 | 10/2012 | Song |
| 2013/0099897 A1 | 4/2013 | Forster |
| 2013/0192933 A1* | 8/2013 | King .................... F16D 66/027 |
| | | 188/1.11 L |
| 2013/0299289 A1* | 11/2013 | Eichler ................ F16D 66/027 |
| | | 188/251 R |
| 2014/0311833 A1 | 10/2014 | Martinotto |
| 2015/0152931 A1 | 6/2015 | Moore |
| 2016/0305500 A1* | 10/2016 | Eden .................... F16D 66/024 |
| 2016/0305502 A1* | 10/2016 | Eden .................... F16D 66/027 |
| 2016/0363182 A1* | 12/2016 | Eden .................... F16D 66/024 |

OTHER PUBLICATIONS

Wikipedia—Downloaded on Nov. 11, 2015 from https://en.wikipedia.org/wiki/Brake_wear_indicator, prior art reference as of at least Nov. 11, 2015.

* cited by examiner

SYSTEMS AND METHODS FOR DETECTING WEAR OF BRAKE PADS

CROSS-REFERENCE TO RELATED APPLICATIONS

The entire contents of the following application are incorporated by reference herein: U.S. Provisional Patent Application No. 62/178,660; filed Apr. 17, 2015; and entitled BRAKE WEAR INDICATOR SYSTEM.

The entire contents of the following application are incorporated by reference herein: U.S. Provisional Patent Application No. 62/230,732; filed Jun. 15, 2015; and entitled BRAKE WEAR INDICATOR DEVICE.

The entire contents of the following application are incorporated by reference herein: U.S. Provisional Patent Application No. 62/231,607; filed Jul. 11, 2015; and entitled SYSTEM AND METHOD TO DETECT THE WEARING STATUS OF A VEHICLE'S BRAKE PAD.

The entire contents of the following application are incorporated by reference herein: U.S. Provisional patent application Ser. No. 14/829,283; filed Aug. 18, 2015; entitled SYSTEMS AND METHODS FOR DETECTING WEAR OF BRAKE PADS.

The entire contents of the following application are incorporated by reference herein: U.S. Provisional patent application Ser. No. 15/138,904; filed Apr. 26, 2016; entitled SYSTEMS AND METHODS FOR DETECTING WEAR OF BRAKE PADS.

The entire contents of the following application are incorporated by reference herein: U.S. Provisional patent application Ser. No. 15/132,757; filed Apr. 19, 2016; entitled SYSTEMS AND METHODS FOR DETECTING WEAR OF BRAKE PADS.

The entire contents of the following application are incorporated by reference herein: U.S. Provisional patent application Ser. No. 15/156,036; filed May 16, 2016; entitled SYSTEMS AND METHODS FOR DETECTING WEAR OF BRAKE PADS.

The entire contents of the following application are incorporated by reference herein: PCT Patent Application No. PCT/US16/27998; filed Apr. 16, 2016; entitled SYSTEMS AND METHODS FOR DETECTING WEAR OF BRAKE PADS.

BACKGROUND

Field

The invention is directed in general to vehicle brake pads, and more specifically, to brake pad wear sensors to measure the actual amount of wear of a brake pad.

Description of Related Art

Vehicle maintenance requires periodic inspection of brake pads in order to assess the deterioration of the brake pads and ultimately determine when the brake pads need to be replaced. Failure to periodically perform this inspection can result in accidents due to brake malfunctions, which can result in danger to vehicle occupants and costly repairs to the vehicle.

Accordingly, brake inspections are required for various types of braking systems, such as drum-based brakes, in which a padded "shoe" presses against the wall of the wheel's drum, and disk brakes, in which two pads press against opposing sides of the rotating wheel disk (rotor). In the disk brake system, the rotor is a hard metal rotating disk, which is attached to the rotating wheel. Two brake pads made of relatively soft material are located on both sides of the rotor at close proximity. When the brake pedal is depressed, the two pads are forced towards the rotor to provide friction force that slows the wheel's rotation. As time progresses, the brake pads can become thinner and may need to be replaced. In most vehicles, it is not obvious to the vehicle operator as to when the brake pads need to be replaced because each wheel often has to be removed to inspect the brake pads. Consequently, the brake pad can totally wear out and the hard metal pad holders can come in contact with the rotor causing substantial damage and creating dangerous and inefficient braking of the vehicle.

In order to improve the inspection process, some vehicles can include embedded sensors to indicate excessive pad wear. As shown in FIG. 1, some systems can include a contact sensor attached in parallel to the internal wall of the pad holder or embedded in the pad at a specific distance from the pad holder. When the pad is worn to a point where it needs to be replaced, the sensor can establish electrical contact with the rotor. An electrical wire can convey the information to the vehicle's dashboard to generate a visual alarm indication for the vehicle operator. As further shown in FIG. 1, some vehicles may employ a distance sensor, which can continuously measure the distance between the two pad holders and thereby provide the information via electrical wires to the vehicle's dashboard.

There are several disadvantages of these systems, namely, undue false positives indicating to the vehicle operator to replace the brake pads. Car manufacturers may incur substantial liability for any false negative occurrences. In other words, if the brake pad is in need of replacement and the system does not generate an alarm, and a consequent accident occurs, the manufacturer may be responsible due to the fact that no alarm was generated. Consequently, the sensors and associated alarm indications may be designed to be overly sensitive to avoid the false negative scenario. Even still, a rupture in the wires connecting the sensor to the dashboard can also produce an alarm not related to the actual condition of the brake pad. This false positive indication can become so frequent and so disturbing to vehicle operators, that many operators deactivate the system entirely, thereby defeating the whole purpose of the system.

Another disadvantage to the "dashboard approach" is that it does not typically provide specific information about which brake pad needs to be replaced. Since brake pads may wear at different rates, the operator has to remove all the wheels to determine which pad is in need of maintenance. For vehicles, such as large trucks with many wheels, in which removal of wheels is costly and labor intensive, the dashboard approach can provide little value. Thus, there is a need for devices and methods to allow reliable inspection of brake pads without removing the wheels.

SUMMARY

The present disclosure includes systems for indicating wear of a brake pad attached to a vehicle. The system can include a pad holder and a brake pad mechanically coupled to the pad holder. The brake pad can have a braking surface arranged and configured to contact a rotating portion of a wheel, such as a rotor or a drum, an internal portion, and a cavity that extends from the braking surface into the internal portion. The system can include a sensing device coupled to the brake pad and located at least partially within the cavity. The sensing device can include a first electrode and a second electrode embedded within the sensing device. The first electrode and the second electrode can measure electrical resistivity of an electrically conductive material located within the sensing device. The electrical resistivity can indicate a thickness of the internal portion of the brake pad after the internal portion has been eroded by the rotating portion of the wheel. Additionally, the electrical resistivity can be proportional or inversely proportional to the thickness, and the electrically conductive material can be partially electrically conductive. The sensing device can be entirely located within the cavity.

The electrically conductive material can be located between the first electrode and the second electrode. In some embodiments, the sensing device comprises a capsule defining an inner portion that encapsulates the first electrode, the second electrode, and the electrically conductive material. The inner portion can comprise a filling material that at least partially surrounds the first electrode, the second electrode, and the electrically conductive material. As well, the electrically conductive material can comprise material used in the fabrication of commercial resistors.

The braking surface can extend along a first direction and a second direction that is perpendicular to the first direction. The cavity can extend from the braking surface into the internal portion along a third direction that is perpendicular to both the first direction and the second direction. Additionally, the first electrode and the second electrode can be elongate along the third direction. Moreover, a top surface of the first electrode and a top surface of the second electrode can be initially offset from the braking surface by a predetermined distance along the third direction.

In some embodiments, the system includes an on-board electronic module communicatively coupled to the sensing device and mechanically coupled to the vehicle. The on-board electronic module can be arranged and configured to receive data associated with the thickness of the brake pad. The on-board electronic module can include an alarm to indicate that the brake pad needs to be replaced. The sensing device can be electrically coupled to the on-board electronic module via at least two electrical wires. The at least two electrical wires extend from the sensing device through the pad holder.

In some embodiments, the on-board electronic module comprises memory. The memory can store data associated with the brake pad comprising at least one of initial brake pad thickness information, initial measured electrical resistivity, calculated current brake pad thickness, brake pad installation information comprising at least one of a date and a location, and wheel identification information comprising a location of the wheel with respect to the vehicle. A present thickness of the internal portion of the brake pad can be calculated by a formula relating a present measured electrical resistivity to the initial measured electrical resistivity.

Even still, in some embodiments, the system can include a remote computing device communicatively coupled to the sensing device. The remote computing device can be arranged and configured to display a visual indication of the thickness of the internal portion of the brake pad. The remote computing device can comprise a wireless receiver with a display showing the visual indication.

The disclosure can also include another system for indicating wear of a brake pad attached to a vehicle. The system can include a pad holder and a brake pad mechanically coupled to the pad holder. The brake pad can have an internal portion and a braking surface arranged and configured to contact a rotating portion of a wheel, such as a rotor or a drum. The system can include a sensor holder mechanically coupled to the pad holder. In some embodiments, the sensor holder is located external to the brake pad. The system can include a sensing device coupled to the sensor holder. The sensing device can include a pair of electrodes embedded within the sensing device. The pair of electrodes can measure electrical resistivity of an electrically partially conductive material located within the sensing device. The electrical resistivity can indicate a thickness of the internal portion of the brake pad after the internal portion has been eroded by the rotating portion of the wheel. The electrical resistivity can be proportional or inversely proportional to the thickness, and the electrically conductive material can be partially electrically conductive.

In some embodiments, the sensor holder physically contacts a first side surface of the brake pad. As well, in some embodiments, the sensor holder is referred to as a first sensor holder, the sensing device is a first sensing device, and the pair of electrodes is a first pair of electrodes. In this regard, the system can include a second sensor holder mechanically coupled to the pad holder. The second sensor holder can be located external to the brake pad. The second sensor holder can physically contact a second side surface of the brake pad whereby the second side surface is opposite the first side surface. Accordingly, the system can include a second sensing device coupled to the second sensor holder. The second sensing device can comprise a second pair of electrodes embedded within the second sensing device. The second pair of electrodes can measure electrical resistivity of an electrically partially conductive material located within the second sensing device. The second pair of electrodes can be elongate along the third direction. The multiplicity of sensors enable accurate assessment of any uneven wearing which by itself requires earlier replacement of the pad.

The disclosure also includes a method of using a system for indicating wear of a brake pad attached to a vehicle. The system can include a brake pad having a braking surface arranged and configured to contact a rotating portion of a wheel, an internal portion, and a cavity that extends from the braking surface into the internal portion. The system can include a sensing device coupled to the brake pad and located within the cavity. The sensing device can include a first electrode and a second electrode embedded within an inner portion of the sensing device. The first electrode and the second electrode measure electrical resistivity of an electrically conductive material located between the first electrode and the second electrode. Methods can include determining, via the first electrode and the second electrode, electrical resistivity of the electrically conductive material.

In some embodiments, the method includes determining a thickness of the internal portion of the brake pad after the internal portion has been eroded by the rotating portion of the wheel. Methods can also include receiving, via an on-board electronic module that is communicatively coupled to the sensing device, an indication of the thickness of the internal portion of the brake pad.

Even still, in some embodiments, the method includes displaying, by a dashboard of the vehicle, an indication of real-time thickness of the internal portion of the brake pad. Methods can include displaying, by a remote computing device communicatively coupled to the sensing device, an indication of real-time thickness of the internal portion of the brake pad. The remote computing device can include at least one of a smart phone, a tablet, a personal computer, and a microprocessor based circuitry.

Methods can even include emitting an alert, via an alarm communicatively coupled to the sensing device, that the thickness of the internal portion of the brake pad meets a predetermined thickness indicating that the brake pad needs to be replaced. The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments. The above and other features of the present invention will become more apparent by describing in detail exemplary embodiments thereof with reference to the accompanying drawings, in which.

DETAILED DESCRIPTION

Figure 1:
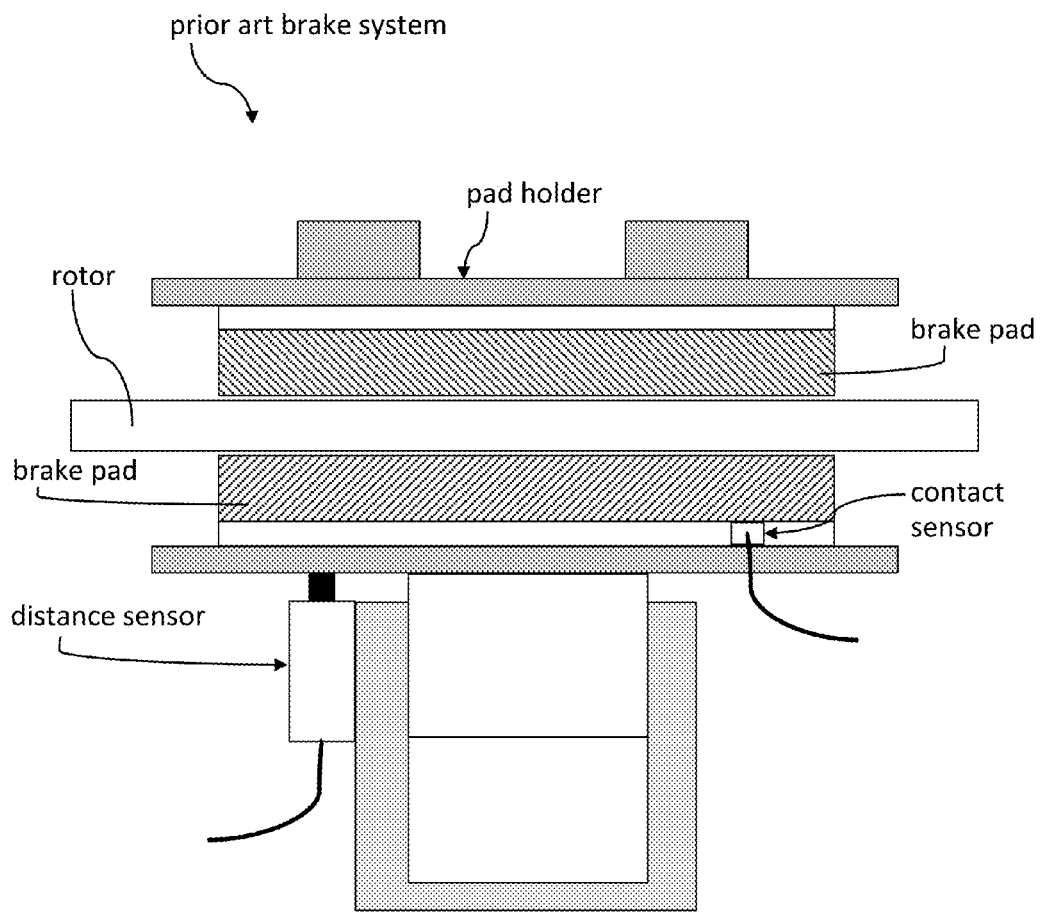
FIG. 1 illustrates a brake system, according to a prior art embodiment.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

LIST OF REFERENCE NUMERALS

Figure 2:
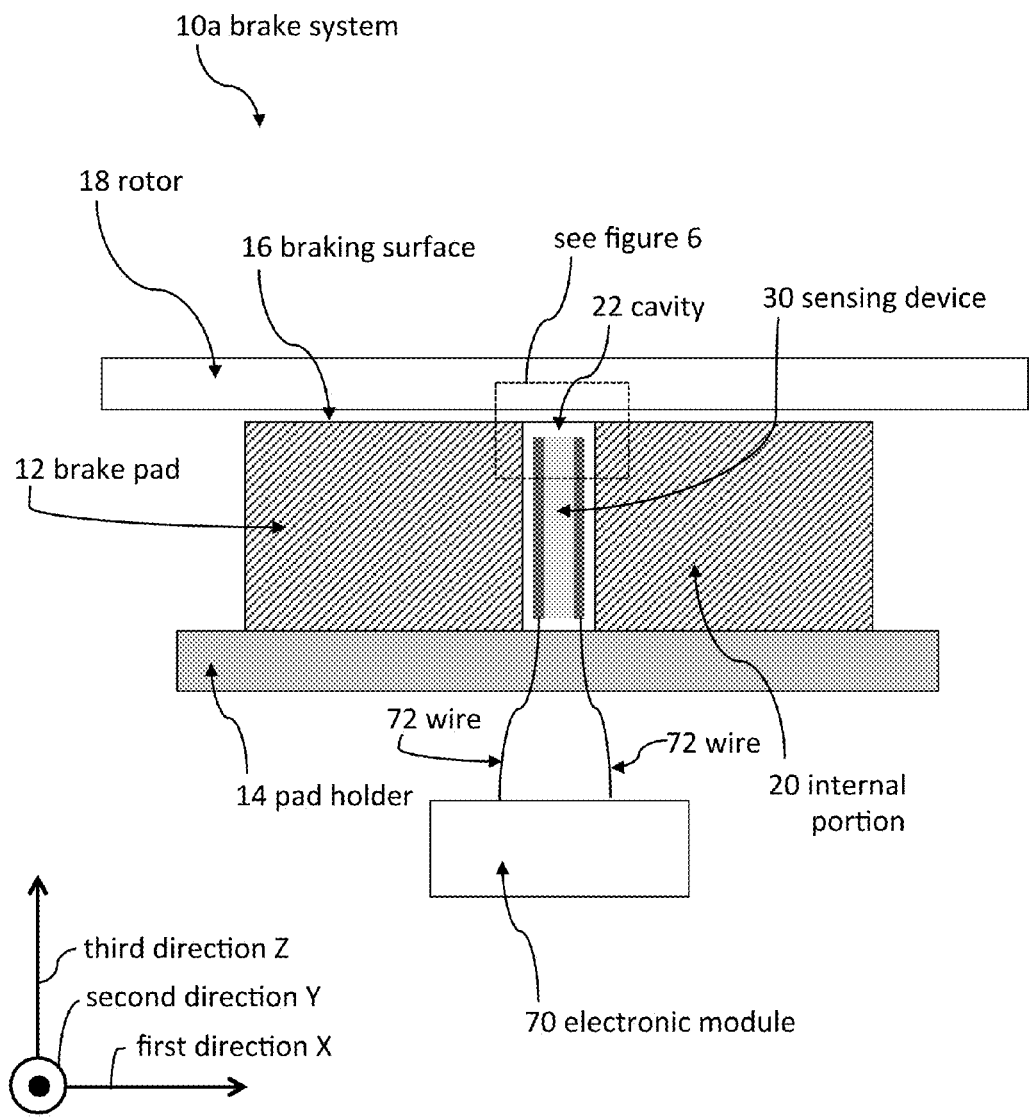
FIG. 2 illustrates a brake system, according to embodiments of the present disclosure.
Figure 3:
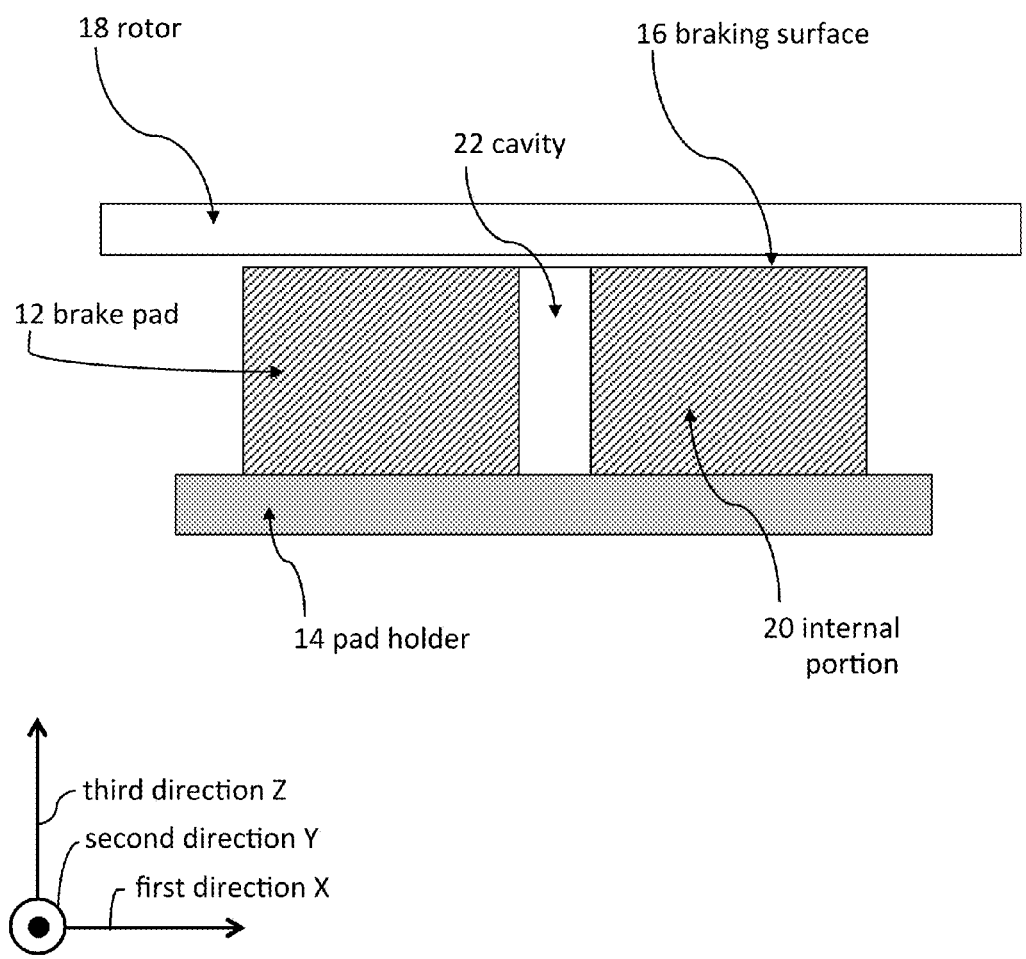
FIG. 3 illustrates the brake system of FIG. 2 without a sensing device and an electronic module, according to embodiments of the present disclosure.
Figure 4:
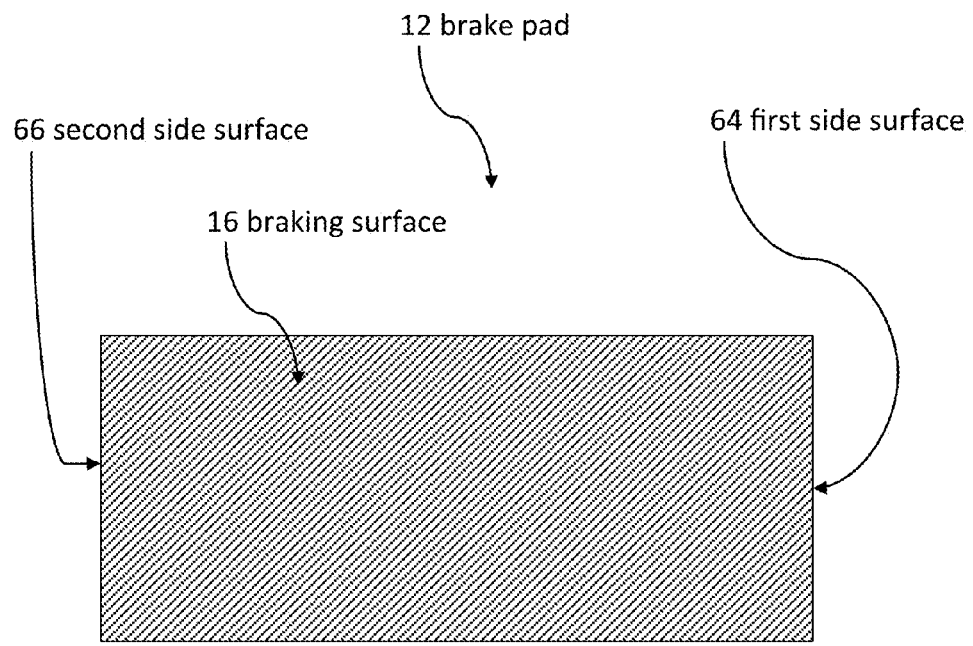
FIG. 4 illustrates an upper view of a brake pad, according to embodiments of the present disclosure.
Figure 4:
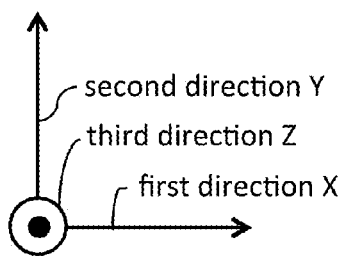

10—Brake system
12—Brake pad
14—Pad holder
16—Braking surface
18—Rotor
20—Internal portion
22—Cavity
30—Sensing device
32—Electrode
34—Electrically conductive material
36—Capsule
38—Inner portion
40—Filling material
50—Sensor holder
60—Top surface
62—Predetermined distance
64—First side surface
66—Second side surface
70—Electronic module
72—Wire
Introduction The brake system 10, as disclosed, can address the disadvantages as previously described. For example, embodiments of the brake system 10 can wirelessly provide information regarding wear of a brake pad 12 of a vehicle. In this regard, a technician performing an inspection of the brake pad 12 may interrogate the brake system 10, via an external wireless transmitter (e.g. a smart phone, tablet, personal computer, and any device having a microprocessor based circuitry), and thereby determine the wear of the brake pad 12. The technician may thereby perform the inspection without having to remove the individual wheel from the vehicle. In this regard, once the technician determines which brake pads 12 are in need of being replaced, only the wheels of worn or defective brake pads 12 may be removed to thereby replace the respective brake pads 12. Even still, some embodiments may include an electronic module 70 located on a dashboard of a vehicle to thereby provide brake pad thickness information for the vehicle user. These are just a few benefits and the person of ordinary skill in the art may appreciate additional benefits.
Sensing Device Embodiments FIGS. 2 and 3 illustrate a system 10a for indicating wear of a brake pad 12 attached to a vehicle. The braking system 10a includes a pad holder 14 and a brake pad 12 mechanically coupled to the pad holder 14. It should be appreciated that the brake pad 12 has a braking surface 16 arranged and configured to contact and impede a rotating portion of a wheel, such as a rotor 18. As shown in FIG. 4, the braking surface 16 extends along a first direction X and a second direction Y that is perpendicular to the first direction X.

As shown in FIG. 3, the brake pad 12 can have an internal portion 20 and a cavity 22 that extends from the braking surface 16 into the internal portion 20. Stated differently, and as illustrated in FIG. 4, the cavity 22 can extend from the braking surface 16 into the internal portion 20 along a third direction Z that is perpendicular to both the first direction X and the second direction Y.

The system 10a can indicate wear of the brake pad 12 by a sensing device 30 coupled to the brake pad 12 and located at least partially within the cavity 22. In some embodiments, the sensing device 30 is entirely located within the cavity 22.

Figure 5:
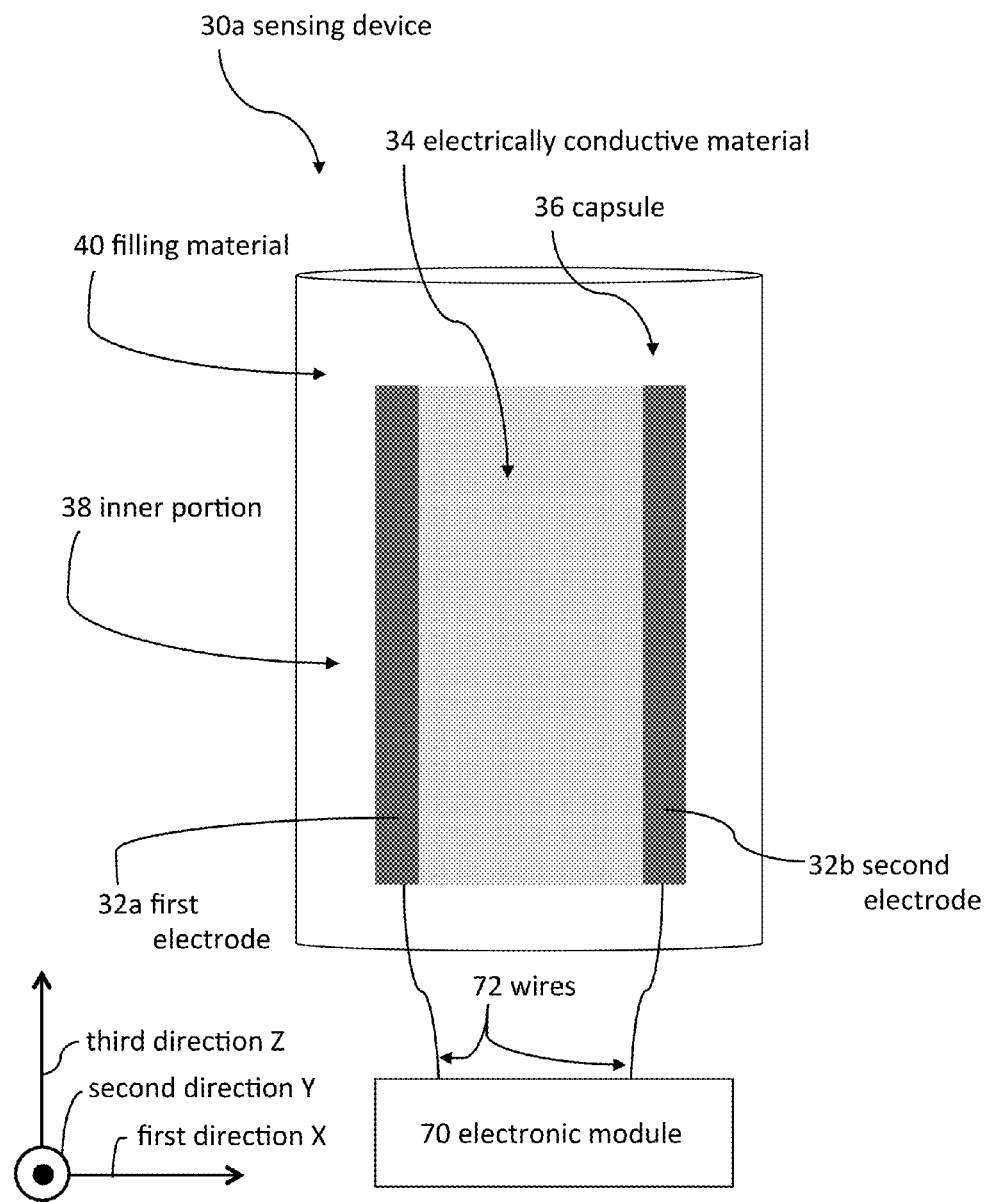
FIG. 5 illustrates a sensing device, according to embodiments of the present disclosure.
Figure 6:
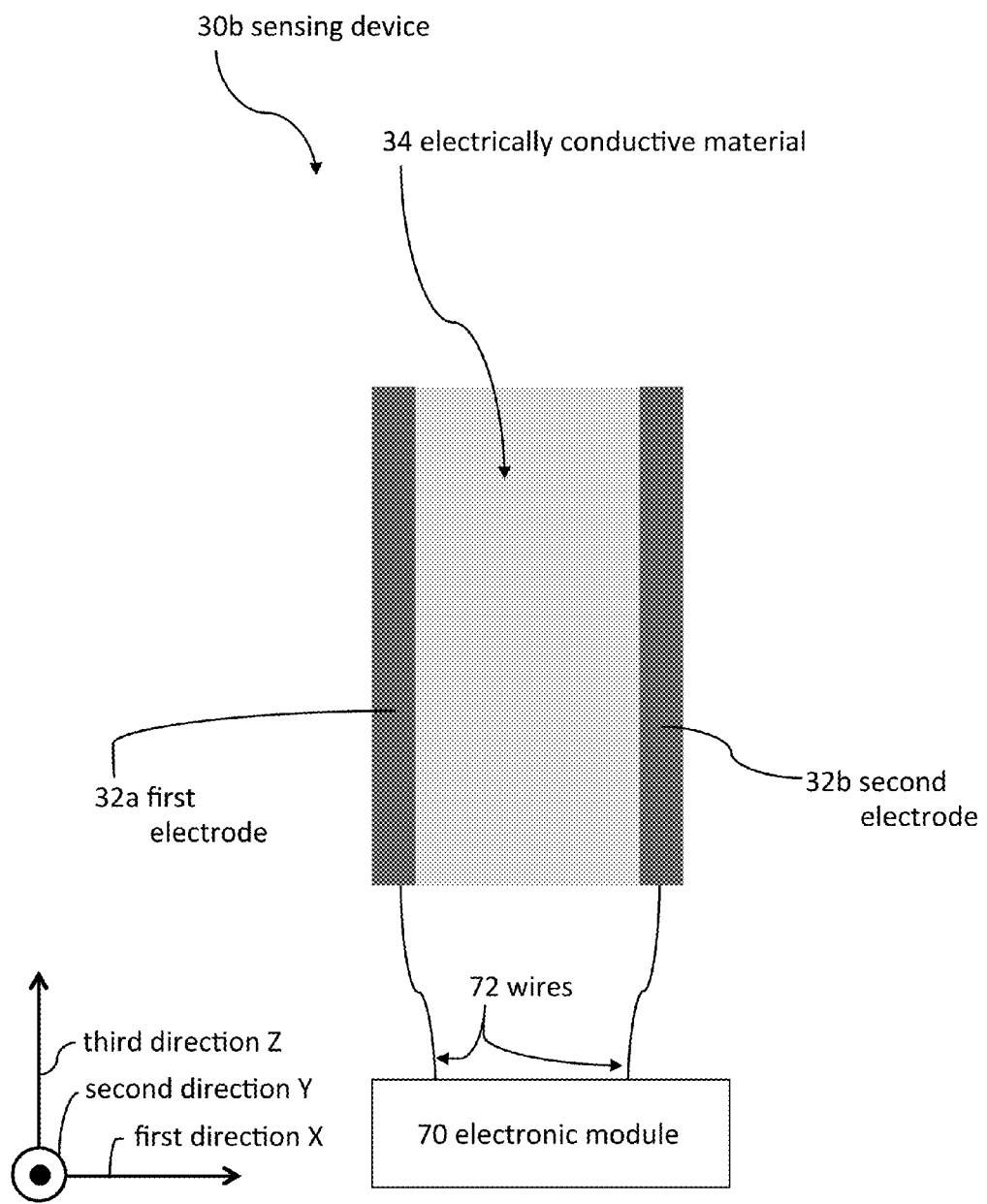
FIG. 6 illustrates another sensing device, according to embodiments of the present disclosure.

As shown in FIGS. 5 and 6, the sensing device 30 can include a first electrode 32a and a second electrode 32b embedded within the sensing device 30 whereby the first electrode 32a and second electrode 32b are elongate along the third direction Z. As illustrated, the electrically conductive material 34 can be located between the first electrode 32a and the second electrode 32b. Described differently, the sensing device 30 can be a surface mount resistor with electrodes on each side and partially conductive material located between the electrodes.

It should also be appreciated that the illustrations in FIGS. 2 and 3 only depict a first brake pad 12. In reality, most vehicle braking systems include at least a second brake pad 12b located on the opposite side of the first brake pad 12. Accordingly, the system 10 can include a second sensing device 30b coupled to the second brake pad 12b.

To determine brake pad wear, the first electrode 32a and the second electrode 32b can measure electrical resistivity of an electrically conductive material 34 located within the sensing device 30. It should be appreciated that the electrically conductive material 34 is at least partially electrically conductive. In some embodiments, the electrically conductive material 34 can comprise at least one of metallic particulate matter, conductive carbon particulate matter, and a combination of metallic particulate matter and conductive carbon particulate matter.

The electrical resistivity can indicate a thickness of the internal portion 20 of the brake pad 12 after the internal portion 20 has been eroded by the rotor 18. In other words, as the internal portion 20 is worn by the rotor 18, the sensing device 30 and the electrically conductive material 34 are also worn along with the internal portion 20. Accordingly, the electrical resistivity of the electrically conductive material 34 can thereby indicate the thickness of the internal portion 20 of the brake pad 12. It should be appreciated that the electrical resistivity can be proportional or inversely proportional to the thickness.

As further illustrated in FIG. 5, the sensing device 30 can include a capsule 36 defining an inner portion 38 that encapsulates the first electrode 32a, the second electrode 32b, and the electrically conductive material 34. The capsule 36 can be press-fitted into the cavity 22 and/or coupled to the cavity 22 via epoxy. The inner portion 38 of the capsule can include a filling material 40 that at least partially surrounds the first electrode 32a, the second electrode 32b, and the electrically conductive material 34. The capsule 36 can include any type of neutral material, such as a soft metal, plastic, or ceramic. The filling material 40 can comprise any type of material, such as epoxy, adhesive material, and/or potting material (e.g. ceramic potting material).

As shown in FIG. 6, the sensing device 30b can be devoid of a capsule 36, and thereby an inner portion 38 and filling material 40. In this regard, the first electrode 32a and the second electrode 32b can define the outer surface of the sensing device 30. The sensing device 30b can be placed within the cavity 22 and secured in place via any type of filling or potting material, such as epoxy.

Figure 7:
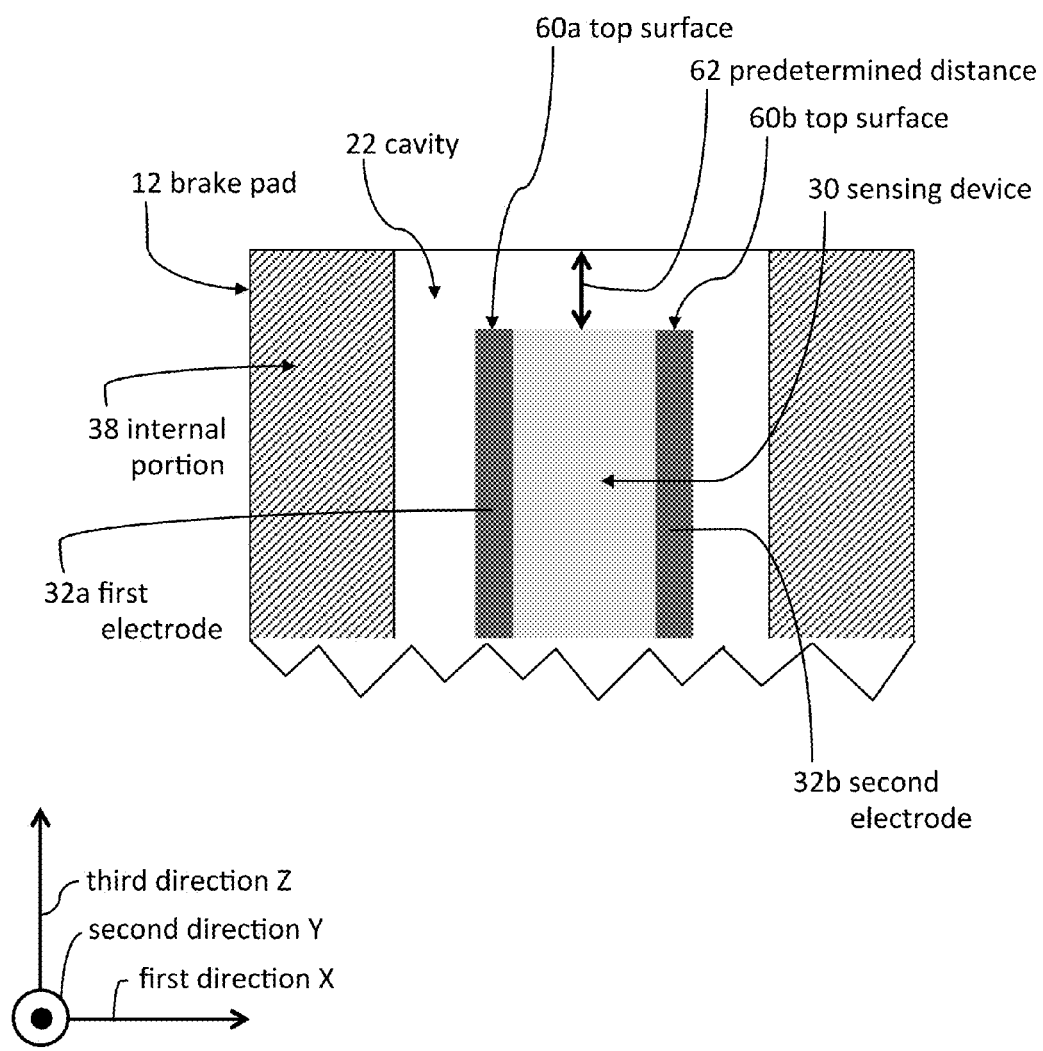
FIG. 7 illustrates a close-up of the dashed portion from FIG. 2, according to embodiments of the present disclosure.
Figure 8:
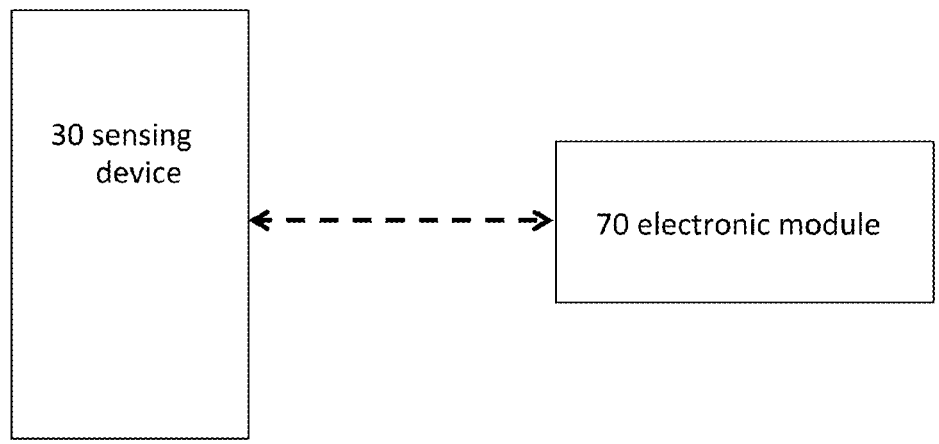
FIG. 8 illustrates a sensing device and an electronic module, according to embodiments of the present disclosure.

In some embodiments, the first electrode 32a and the second electrode 32b are vertically offset with respect to the braking surface 16. As shown in greater detail in FIG. 7, a top surface 60a of the first electrode 32a and a top surface 60b of the second electrode 32b are initially offset from the braking surface 16 by a predetermined distance 62 along the third direction Z. Accordingly, the first and second electrodes 32a, 32b can indicate that the internal portion 38 of the brake pad 12 has no wear until the rotor 18 has worn the internal portion 38 of the brake pad 12 by a thickness that is at least equal to the predetermined distance 62.

As shown in various figures, including FIGS. 2, 5, 6, 8, and 9, the system 10 can include an electronic module 70 communicatively coupled to the sensing device 30. In some embodiments, the electronic module 70 is wirelessly coupled to the sensing device 30. However, the electronic module 70 can be electrically coupled to the sensing device 30 via at least two electrical wires 72. The at least two electrical wires 72 can extend from the sensing device 30 through the pad holder 14 and to the electronic module 70.

In some embodiments, the electronic module 70 is an on-board electronic module 70 that is mechanically coupled to the vehicle. Furthermore, the electronic module 70 can be arranged and configured to receive data associated with the thickness of the brake pad 12. In some embodiments, the electronic module 70 includes an alarm 74 that can indicate when the brake pad 12 needs to be replaced. The alarm 74 can be any type of visual or audible alarm that can indicate the thickness of the brake pad 12. In some embodiments, the alarm 74 includes a percentage of the remaining brake pad 12 thickness. Even still, in some embodiments, the alarm 74 can include a colored icon, such as a green icon to indicate that the brake pad 12 has an acceptable thickness of pad remaining. Accordingly, the alarm 74 can include a red icon to indicate that the brake pad 12 needs to be replaced. As such, when the brake pad 12 is "good" (i.e. not in need of replacement) the green icon can be illuminated, and when the brake pad 12 is "bad" (i.e. in need of replacement) the red icon can be illuminated. These are just a few of the many examples of alarms 74 that can be implemented.

Figure 9:
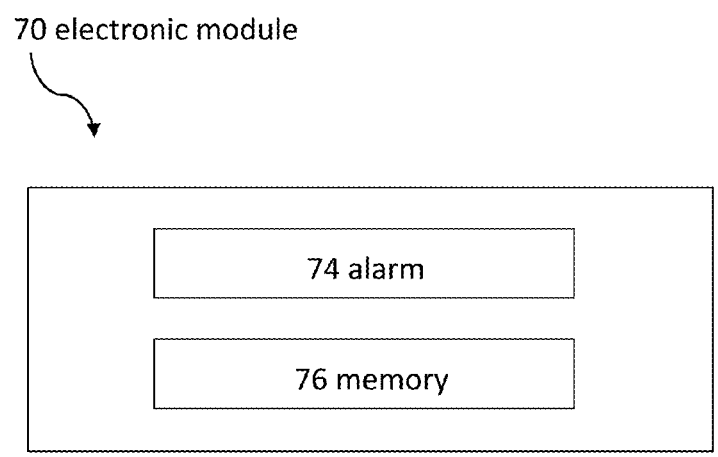
FIG. 9 illustrates an electronic module, according to embodiments of the present disclosure.

As further shown in FIG. 9, the electronic module 70 can include memory 76. The memory 76 can store data associated with the brake pad 12 comprising initial brake pad thickness information, initial measured electrical resistivity, calculated current brake pad thickness, brake pad installation information comprising at least one of a date and a location, and/or wheel identification information comprising a location of the wheel with respect to the vehicle. In some embodiments, a present thickness of the internal portion 20 of the brake pad 12 is calculated by a formula relating a present measured electrical resistivity to the initial measured electrical resistivity.

Figure 10:
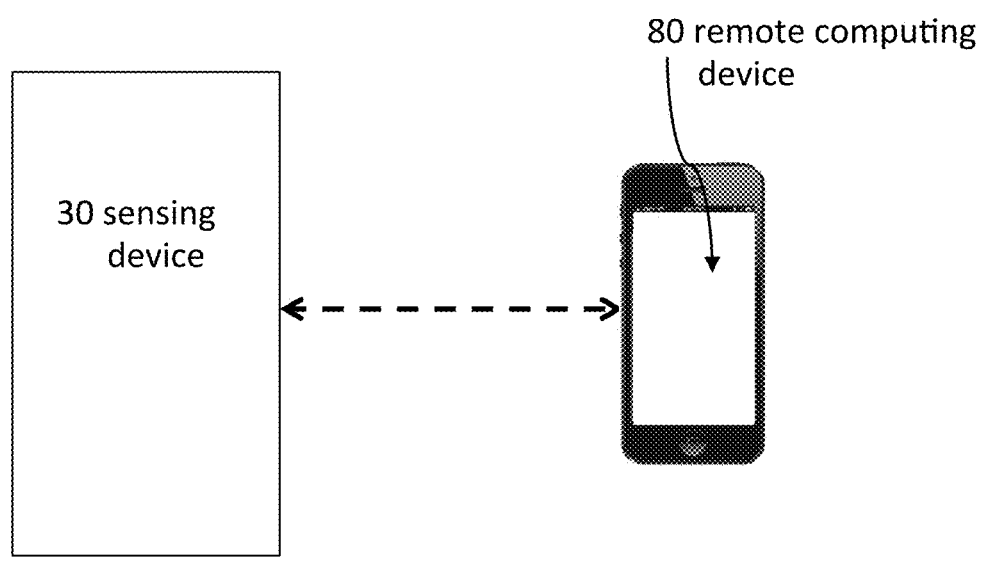
FIG. 10 illustrates a sensing device and a remote computing device, according to embodiments of the present disclosure.

Now with reference to FIG. 10, the system 10 can include a remote computing device 80 communicatively coupled to the sensing device 30. The remote computing device 80 can be a smart phone, tablet, personal computer, and/or any type of microprocessor based circuitry. Furthermore, the remote computing device 80 can be arranged and configured to display a visual indication of the thickness of the internal portion of the brake pad. In some embodiments, the remote computing device 80 can execute software, such as a mobile application, arranged and configured to communicate with the sensing device 30 and thereby retrieve the data and display the visual indication of the brake pad thickness.

Figure 11:
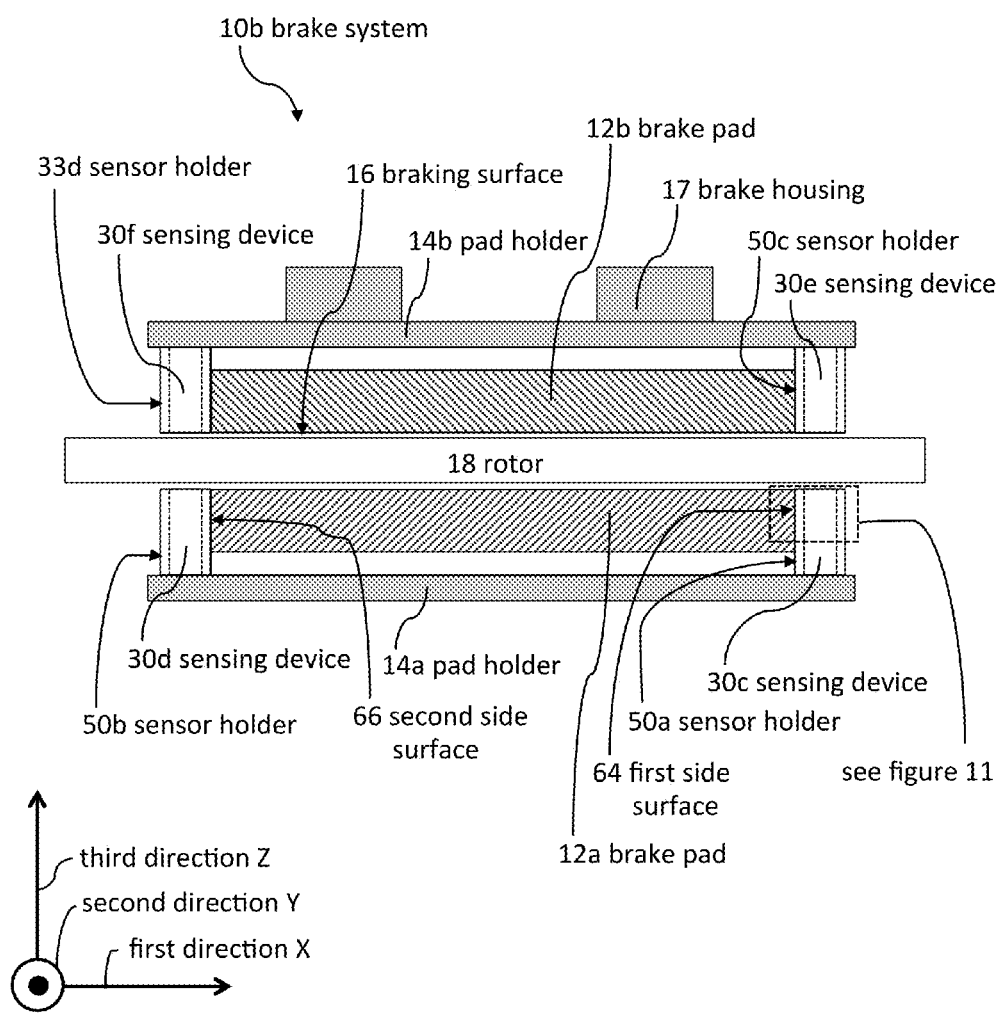
FIG. 11 illustrates another brake system, according to embodiments of the present disclosure.
Figure 12:
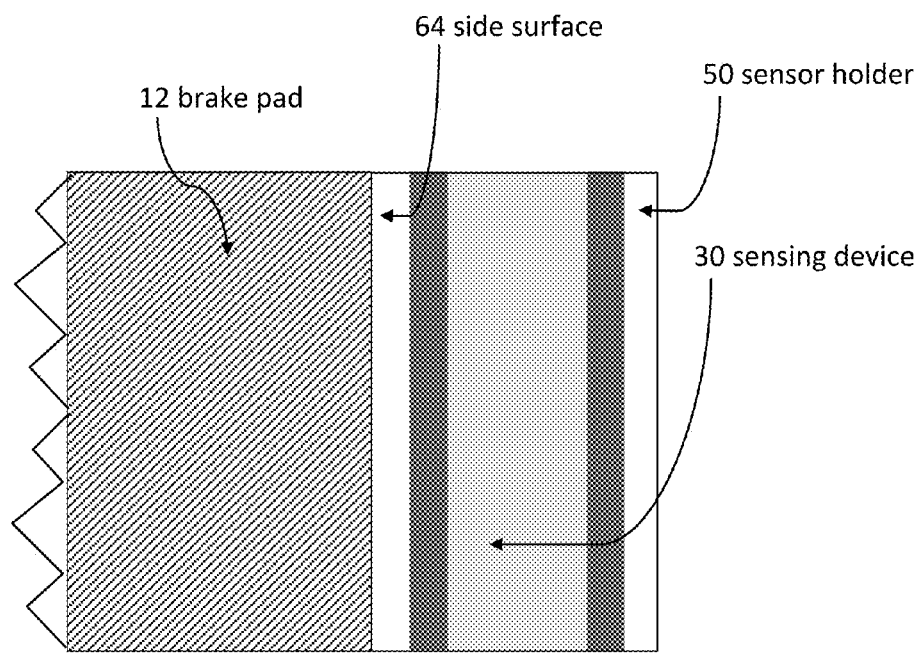
FIG. 12 illustrates a close-up of the dashed portion from FIG. 10, according to embodiments of the present disclosure.
Figure 12:
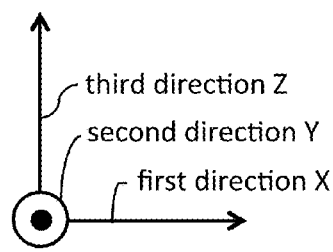

As illustrated in FIG. 11, the system 10b can be devoid of a cavity 22, as previously disclosed. In this regard, the system 10b can be retrofitted to existing braking systems. For example, the system 10b can include a pad holder 14, a brake pad 12 mechanically coupled to the pad holder 14, and a sensor holder 33 mechanically coupled to the pad holder 14. In some embodiments, the sensor holder 33 is located external to the brake pad 12. Specifically, the sensor holder 33 can physically contact a side surface 64, 66 of the brake pad 12. Additionally, the system 10b can include a sensing device 30 coupled to the sensor holder 33. As shown in FIG. 11, the system 10b can include two or more sensor holders 33 and sensing devices 30.

Figure 13:
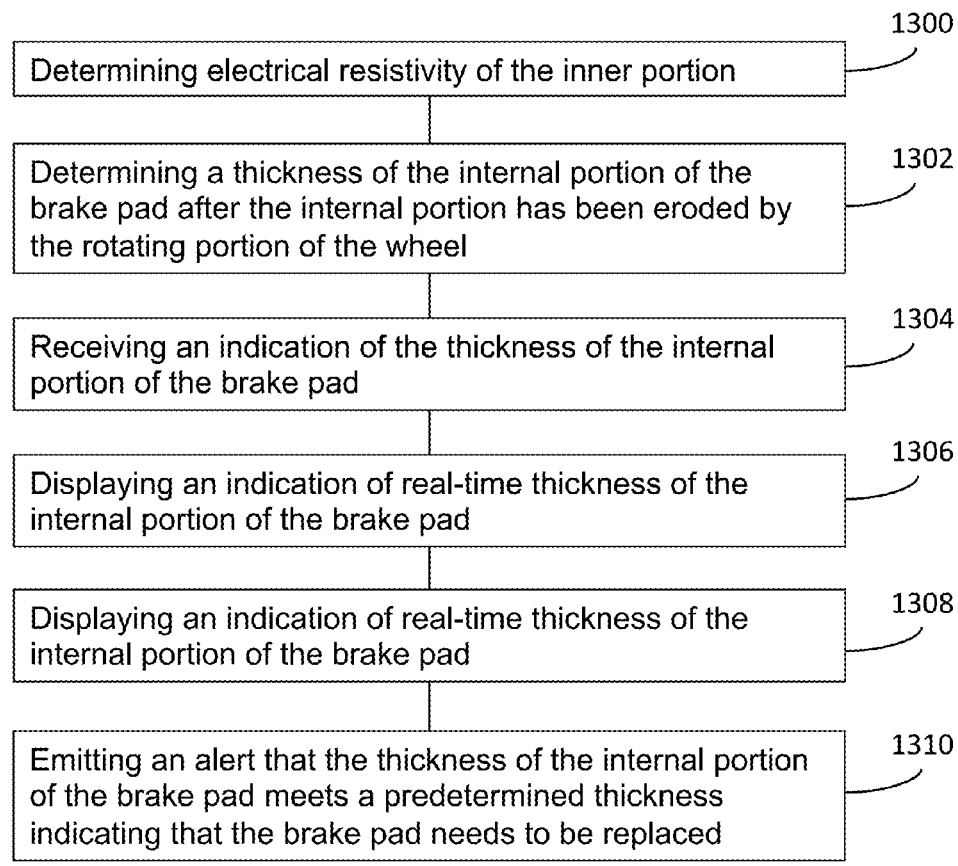
FIG. 13 depicts a flow diagram showing methods of operating brake systems, according to some embodiments.

As shown in FIG. 13, the disclosure also includes methods of using a system for indicating wear of a brake pad attached to a vehicle. The method can include determining, via the first electrode 32a and the second electrode 32b, electrical resistivity of the electrically conductive material (at step 1300). As well, methods can include determining a thickness of the internal portion 20 of the brake pad 12 after the internal portion 20 has been eroded by the rotor 18 (at step 1302). Methods can also include receiving, via an on-board electronic module 70 that is communicatively coupled to the sensing device 30, an indication of the thickness of the internal portion 20 of the brake pad 12 (at step 1304).

Some methods can include displaying, by a dashboard of the vehicle, an indication of real-time thickness of the internal portion 20 of the brake pad 12 (at step 1306). Methods can also include displaying, by a remote computing device 80 communicatively coupled to the sensing device 30, an indication of real-time thickness of the internal portion 20 of the brake pad 12 (at step 1308).

Even still, methods can include emitting an alert, via an alarm 74 communicatively coupled to the sensing device 30, that the thickness of the internal portion 20 of the brake pad 12 meets a predetermined thickness indicating that the brake pad 12 needs to be replaced (at step 1310). The predetermined thickness can be any thickness determined by a brake pad and/or vehicle manufacturer. In some embodiments, a user can input their own predetermined thickness. In this regard, the predetermined thickness can be preprogrammed by the manufacturer or customized by the user.

Interpretation

The phrase "data associated with the brake pad", as used in the disclosure, can be interpreted to mean any type of data that is related to the vehicle, including digital computerized instructions to process brake pad information and/or data.

The phrase "the electrical resistivity is proportional to the thickness" used in the disclosure, can be interpreted to mean any mathematical relationship between the electrical resistivity and the pad's thickness including mathematical formulas and algorithms, such as adaptive algorithms. In this regard, proportional can be interpreted to mean directly proportional or inversely proportional.

The phrase "rotating portion of the wheel", can be interpreted as either a wheel rotor used for disk brakes, or a drum used for shoe type brakes usually embedded in some rear wheel brakes of passenger cars or in heavy trucks None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A system for indicating wear of a brake pad attached to a vehicle, comprising:
   a pad holder;
   a brake pad mechanically coupled to the pad holder, the brake pad having a braking surface arranged and configured to contact a brake rotor; and
   a sensing device coupled to the brake pad such that the sensing device physically contacts a side surface of the brake pad that is adjacent to the braking surface and the sensing device is substantially aligned with the braking surface throughout a life of the brake pad, the sensing device comprising a first electrode and a second electrode embedded within the sensing device, wherein the first electrode and the second electrode measure electrical resistivity of an electrically conductive material located within the sensing device, the electrical resistivity indicates a thickness of the internal portion of the brake pad after the internal portion has been eroded by the brake rotor, the electrical resistivity is proportional to the thickness, and the electrically conductive material is partially electrically conductive.

2. The system of claim 1, wherein at least half of a surface of the sensing device does not contact a surface of the brake pad.

3. The system of claim 1, wherein the electrically conductive material is located between the first electrode and the second electrode.

4. The system of claim 3, wherein the sensing device comprises a capsule defining an inner portion that encapsulates the first electrode, the second electrode, and the electrically conductive material.

5. The system of claim 4, wherein the inner portion comprises filling material that at least partially surrounds the first electrode, the second electrode, and the electrically conductive material.

6. The system of claim 3, wherein the electrically conductive material comprises material used in fabrication of commercial resistors.

7. The system of claim 1, wherein the braking surface extends along a first direction and a second direction that is perpendicular to the first direction,
   wherein the first electrode and the second electrode are elongate along a third direction that is perpendicular to both the first direction and the second direction, and
   wherein a top surface of the first electrode and a top surface of the second electrode are initially offset from the braking surface by a predetermined distance along the third direction.

8. The system of claim 1, further comprising an on-board electronic module communicatively coupled to the sensing device and mechanically coupled to the vehicle, wherein the on-board electronic module is arranged and configured to receive data associated with the thickness.

9. The system of claim 8, wherein the on-board electronic module further comprises an alarm to indicate that the brake pad needs to be replaced.

10. The system of claim 8, wherein the sensing device is electrically coupled to the on-board electronic module via at least two electrical wires, wherein the at least two electrical wires extend from the sensing device through the pad holder.

11. The system of claim 8, wherein the on-board electronic module comprises memory,
    wherein the memory stores data associated with the brake pad comprising at least one of initial brake pad thickness information, initial measured electrical resistivity, calculated current brake pad thickness, brake pad installation information comprising at least one of a date and a location, and wheel identification information comprising a location of the wheel with respect to the vehicle, and
    wherein a present thickness of the internal portion of the brake pad is calculated by a formula relating a present measured electrical resistivity to the initial measured electrical resistivity.

12. The system of claim 1, further comprising a remote computing device communicatively coupled to the sensing device, wherein the remote computing device is arranged and configured to display a visual indication of the thickness of the internal portion of the brake pad, wherein the remote computing device comprises a wireless receiver with a display showing the visual indication.

13. A system for indicating wear of a brake pad attached to a vehicle, comprising:
    a pad holder;
    a brake pad mechanically coupled to the pad holder, the brake pad having an brake portion and a braking surface arranged and configured to contact a brake rotor;
    a sensor holder mechanically coupled to the pad holder and located along a side surface of the brake pad whereby the sensor holder is substantially aligned with the braking surface; and
    a sensing device coupled to the sensor holder, the sensing device comprising a pair of electrodes embedded within the sensing device, wherein the pair of electrodes measures electrical resistivity of an electrically partially conductive material located within the sensing device, wherein the electrical resistivity indicates a thickness of the brake portion of the brake pad after the brake portion has been eroded by the brake rotor, the electrical resistivity is proportional to the thickness, and the electrically conductive material is partially electrically conductive.

14. The system of claim 13, wherein the sensor holder physically contacts the side surface of the brake pad, and wherein at least half of a surface of the sensor holder does not contact a surface of the brake pad.

15. The system of claim 14, wherein the braking surface extends along a first direction and a second direction that is perpendicular to the first direction, and wherein the pair of electrodes is elongate along a third direction that is perpendicular to both the first direction and the second direction.

16. The system of claim 15, wherein the sensor holder is a first sensor holder, the sensing device is a first sensing device, and the pair of electrodes is a first pair of electrodes, the system further comprising:
   a second sensor holder mechanically coupled to the pad holder, wherein the second sensor holder is located external to the brake pad, wherein the second sensor holder physically contacts a second side surface of the brake pad, the second side surface being opposite the first side surface; and
   a second sensing device coupled to the second sensor holder, the second sensing device comprising a second pair of electrodes embedded within the second sensing device, wherein the second pair of electrodes measures electrical resistivity of an electrically partially conductive material located within the second sensing device, and wherein the second pair of electrodes is elongate along the third direction.

17. A method of using a system for indicating wear of a brake pad attached to a vehicle, wherein the system comprises a brake pad having a braking surface arranged and configured to contact a brake rotor, and wherein the system comprises a sensing device coupled to the brake pad and located along a side surface of the brake pad whereby the sensing device is substantially aligned with the braking surface, wherein at least half of a surface of the sensing device does not contact a surface of the brake pad, the sensing device comprising a first electrode and a second electrode embedded within an inner portion of the sensing device, wherein the first electrode and the second electrode measure electrical resistivity of an electrically conductive material located between the first electrode and the second electrode, the method comprising:
   determining, via the first electrode and the second electrode, electrical resistivity of the electrically conductive material;
   determining a thickness of a brake portion of the brake pad after the brake portion has been eroded by the brake rotor, wherein the electrical resistivity of the inner portion indicates the thickness of the brake portion of the brake pad; and
   receiving, via an on-board electronic module that is communicatively coupled to the sensing device, an indication of the thickness of the brake portion of the brake pad.

18. The method of claim 17, further comprising displaying, by a dashboard of the vehicle, an indication of real-time thickness of the brake portion of the brake pad.

19. The method of claim 17, further comprising displaying, by a remote computing device communicatively coupled to the sensing device, an indication of real-time thickness of the brake portion of the brake pad, wherein the remote computing device comprises at least one of a smart phone, a tablet, a personal computer, and a microprocessor based circuitry.

20. The method of claim 17, further comprising emitting an alert, via an alarm communicatively coupled to the sensing device, that the thickness of the brake portion of the brake pad meets a predetermined thickness indicating that the brake pad needs to be replaced.

* * * * *